(12) United States Patent
Huibers et al.

(10) Patent No.: US 7,974,005 B2
(45) Date of Patent: Jul. 5, 2011

(54) DISPLAY SCREEN FOR USE IN FRONT PROJECTORS

(75) Inventors: Andrew Gerrit Huibers, Sunnyvale, CA (US); Jonathan Clayton Doan, San Jose, CA (US)

(73) Assignee: Texas Instruments Incorporated, Dallas, TX (US)

( * ) Notice: Subject to any disclaimer, the term of this patent is extended or adjusted under 35 U.S.C. 154(b) by 327 days.

(21) Appl. No.: 11/954,335

(22) Filed: Dec. 12, 2007

(65) Prior Publication Data

US 2009/0153958 A1 Jun. 18, 2009

(51) Int. Cl.
*G03B 21/60* (2006.01)

(52) U.S. Cl. ........................................................ 359/454

(58) Field of Classification Search .................. 359/454, 359/457, 459, 527
See application file for complete search history.

(56) References Cited

U.S. PATENT DOCUMENTS

| | | | | |
|---|---|---|---|---|
| 2,931,269 A * | 4/1960 | De Lassus St. Genies | ... | 359/443 |
| 3,782,805 A * | 1/1974 | Brown | ........................... | 359/459 |
| 4,012,115 A * | 3/1977 | Brown | ........................... | 359/455 |
| 4,911,529 A * | 3/1990 | Van De Ven | .................. | 359/454 |
| 6,324,011 B1 * | 11/2001 | Higuchi | ........................ | 359/627 |
| 7,239,445 B2 | 7/2007 | Pouslen | | |
| 2003/0107802 A1 | 6/2003 | Dubin et al. | | |
| 2003/0137728 A1 * | 7/2003 | Kuroda et al. | .................. | 359/455 |
| 2004/0223123 A1 * | 11/2004 | Engle et al. | ..................... | 353/69 |
| 2005/0030618 A1 * | 2/2005 | Togino | ........................... | 359/443 |
| 2007/0024967 A1 * | 2/2007 | Peterson et al. | ............... | 359/459 |
| 2007/0195407 A1 | 8/2007 | Pouslen | | |
| 2007/0217005 A1 | 9/2007 | Novet et al. | | |

FOREIGN PATENT DOCUMENTS

GB 2226679 A * 7/1990
JP 2006337944 A * 12/2006

OTHER PUBLICATIONS

Southall, James P. ( Mirrors Prisms and Lenses, Macmillian Company, New York, 1918), p. 113.*

* cited by examiner

*Primary Examiner* — Clayton E Laballe
*Assistant Examiner* — Leon W Rhodes
(74) *Attorney, Agent, or Firm* — Charles A. Brill; Wade James Brady, III; Frederick J. Telecky, Jr.

(57) ABSTRACT

A screen for use in image presentations comprises an array of transmissive elongated prisms. The screen is capable of delivering incident light, having an incident angle within a specific incident angle range, to the viewing area, while preventing ambient light, having an incident angle within another angle range, from being directed to the viewing area. According to one embodiment, in operation, the screen, an image source, and the viewing area are positioned such that the light from the image source is directed to the viewing area.

25 Claims, 8 Drawing Sheets

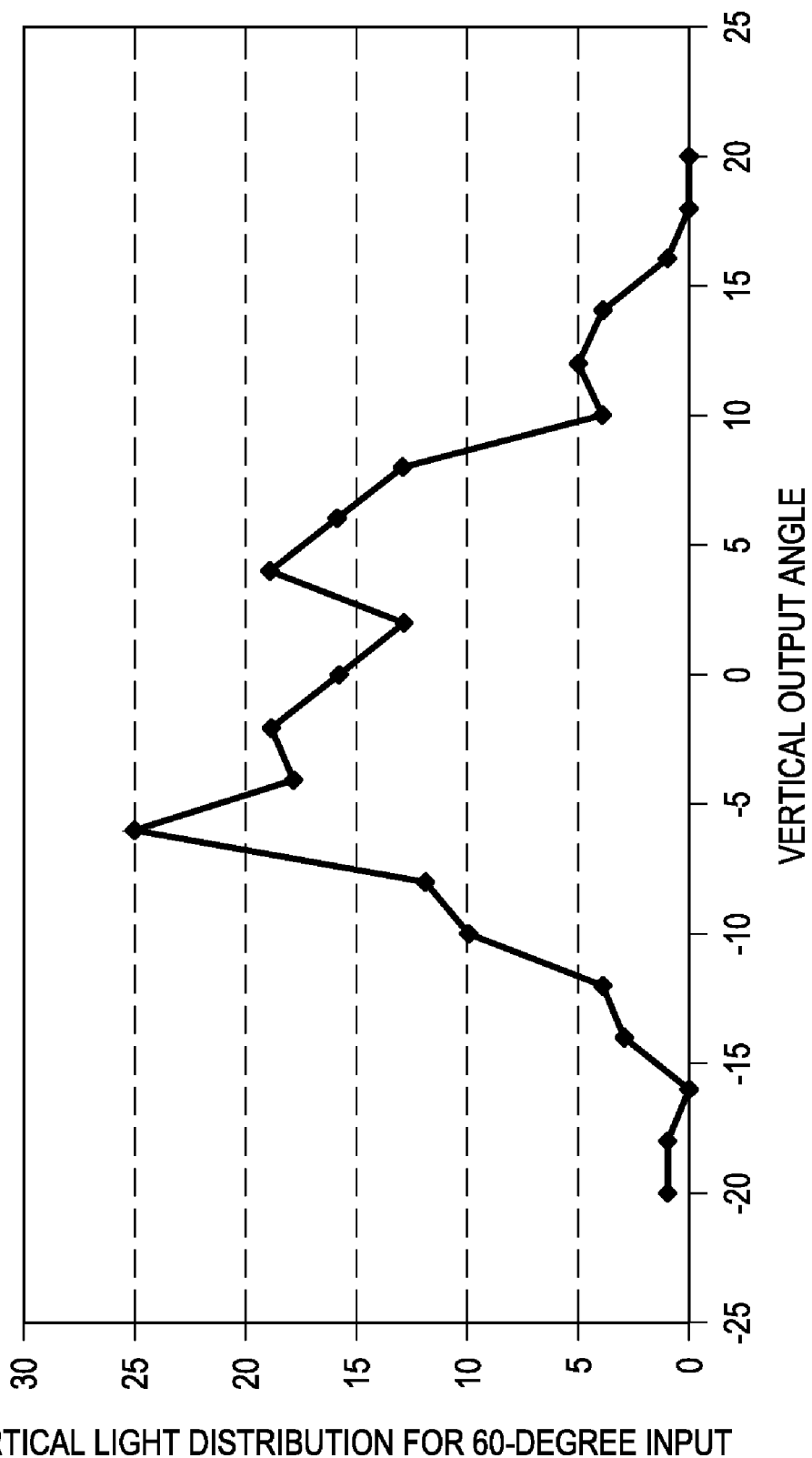

DISPLAY SCREEN FOR USE IN FRONT PROJECTORS

TECHNICAL FIELD OF THE DISCLOSURE

The technical field of this disclosure relates to the art of image display systems, and more particularly to the art of display screens for use in image display systems

BACKGROUND OF THE DISCLOSURE

The contrast ratio in display applications is the ratio of luminance between the brightest white and the darkest black that can be produced by a display system. It is a major determinant of the image quality of the display system. If a displayed image has a high contrast ratio, a viewer will judge it to be sharper than a displayed image with a lower contrast ratio even if the displayed image with a lower contrast has a higher measurable resolution.

The perceived contrast ratio of a displayed image on a screen illuminated from the viewer side using a (front) projector, however, is also dependent from the environment in which the projector is operated and the image is projected. As an example in a conference room, the projected images on the screen appear washed out when the lights in the conference room are turned on. When all lights in the conference room are turned off, the projected images on the screen appear to be more crystal-clear. This effect is due to the reflection of the ambient light into the viewers' eyes by the screen, which in turn, reduces the perceived contrast ratio, even though the projector has a high contrast ratio.

Therefore, what is desired is a method for reducing the reflection of the ambient light by the screen onto the viewers' eyes.

SUMMARY

In one example, a screen for use in a display system is disclosed herein. The system comprises: an array of elongated transmissive polygonal prisms disposed such that light from a light valve of the display system is directed by the screen to a viewer; while an ambient light is directed away from the viewer.

In another example, a method of directing image light from a projector to a viewer in a front-projecting process is disclosed herein. The method comprises: directing the image light carrying an image signal from the projector to an array of elongated prisms of the screen; and delivering the image light to the viewer by the screen, comprising: receiving the image light by a receiving facet of an elongated prism; causing the received image light to evolve within the elongated prism and propagate towards an exit facet; and delivering the image light to the viewer from the exit facet.

In yet another example, a method of directing image light from a projector to a viewer in a front-projecting process is disclosed herein. The method comprises: directing the image light carrying an image signal from the projector to an array of elongated prisms of the screen; and delivering the image light to the viewer by the screen, comprising: receiving the image light by a prism; and causing the received image light to evolve within the prism and to exit from the prism towards a viewer.

In still yet another example, a screen for displaying an image is disclosed herein. The screen turns an incident light on an average between 90 and 135 degrees, wherein the turning is accomplished by one or more totally-internally-reflective reflections.

In yet another example, an image projection system is disclosed herein. The system comprises: a light source; a light valve comprising an array of individually addressable pixels; a screen comprising: an array of elongated transmissive polygonal prisms disposed such that light from a light valve of the display system is directed by the screen to a viewer; while an ambient light is directed away from the viewer; and a set of optical elements for directing light from the light source to the light valve and from the light valve to the screen.

BRIEF DESCRIPTION OF DRAWINGS

FIG. 1b schematically illustrates the vertical viewing angle of the screen in FIG. 1a;

FIG. 1c schematically illustrates the horizontal viewing angle of the screen in FIG. 1a;

FIG. 2a schematically illustrates a cross-section of an exemplary screen in FIG. 1a;

FIG. 2b schematically illustrates a front view of the screen in FIG. 2a;

FIG. 2c schematically illustrates a cross-section view of a transmissive prism of the screen in FIG. 2a;

FIG. 3 schematically illustrates propagations of light beams from the projector through the prisms of the screen in FIG. 2a;

FIG. 4 schematically illustrates propagations of ambient light beams through the prisms of the screen in FIG. 2a;

FIG. 9 is a diagram showing an exemplary vertical viewing angle of the screen where small angle diffusers have been formed on the entrance facet.

DETAILED DESCRIPTION OF SELECTED EXAMPLES

Disclosed herein is a screen on which images can be displayed. The screen has the capability of rejecting ambient light, and therefore, can be used in many image presentation applications, such as front image projections, static and/or animated image display for advertising or esthetic purposes, and any image presentations wherein the image light (light carrying image signals) and viewers are located on the same side of the screen, and wherein the ambient light needs to be depressed or rejected.

In the following, the screen will be discussed with reference to particular examples wherein the screen is used as a display target in a front projector. However, it will be appreciated by those skilled in the art that the following discussion is for demonstration purpose, and should not be interpreted as a limitation. Many other variations within the scope of this disclosure are also applicable.

Figure 1B:
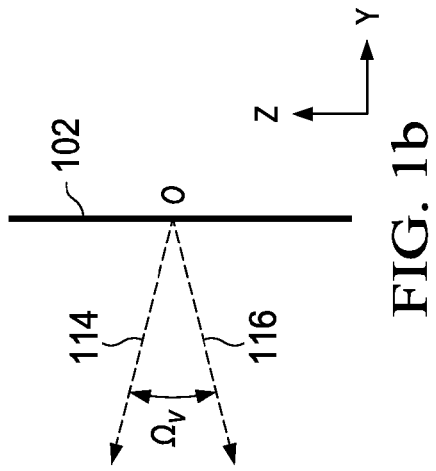
Figure 1C:
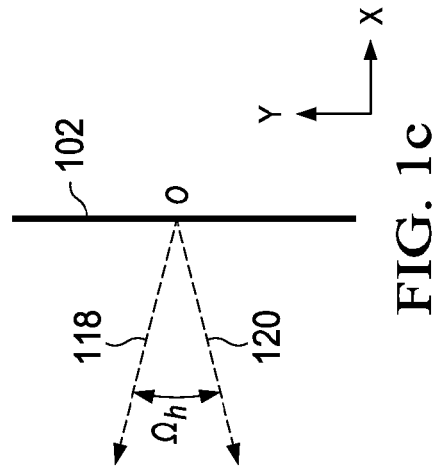
Figure 1A:
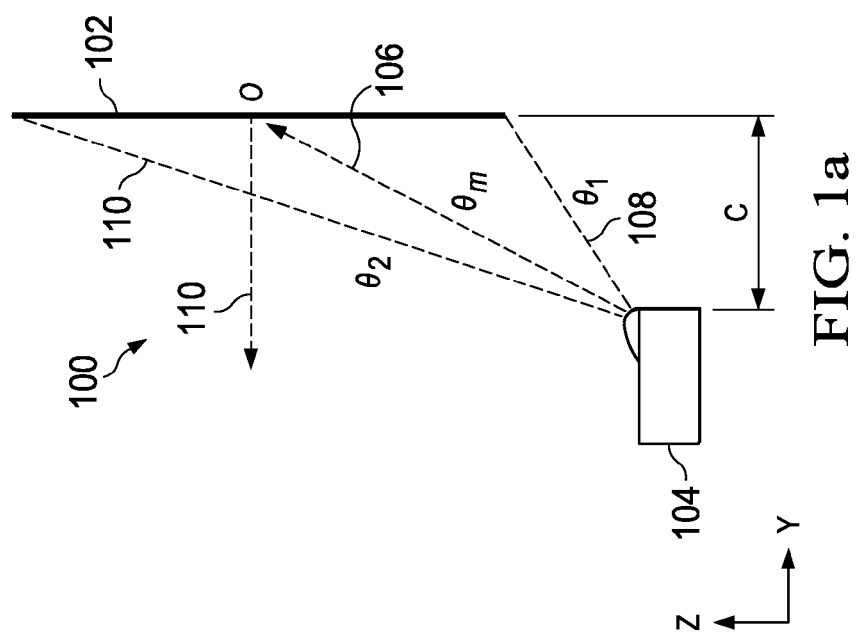
FIG. 1a schematically illustrates an exemplary front projection setup for producing images on a screen.

Referring to the drawings, FIG. 1a schematically illustrates a front-projection setup having a display target (screen), on which images are to be projected and viewed by viewers. In this example, front-projection setup 100 comprises front projector 104 and screen 102. The front-projection setup can be operated in environments with ambient light, such as living rooms, conference rooms and theaters with lights.

In this exemplary front-projection setup, the front projector (104) and the viewers (not shown in the figure) are located on the same side of the screen (102). The projector (104) projects light that carries image signals (e.g. light 106), which is referred to as image light, onto the front side of the screen. The screen reflects the incident image light; and the reflected light (e.g. light 110) by the screen is directed to the viewer for viewing.

The geometry of the front-projection setup can be characterized by the following parameters. The image light (e.g. light 106) connecting the projector (e.g. the projection lens of the projector) and the center O of the screen (106) has an angle $\theta_{in}$ with the horizontal direction (e.g. the Y direction in the YZ plane of the Cartesian coordinate). $\theta_{in}$ can be any suitable angles, which are preferably from 30° to 90°, and more preferably from 35° to 75°, more preferably from 45° to 65°, and more preferably around 55°. The image light (e.g. 108) tangentially passing through the lower edge of the screen (102) has an angle $\theta_1$ with the horizontal direction. $\theta_1$ can be any suitable angles, which is preferably from 10° to 55°, and more preferably from 15° to 45°. The image light (110) tangentially passing through the upper edge of the screen (102) has an angle $\theta_2$ with the horizontal direction. $\theta_2$ can be any suitable angles, which is preferably from 45° to 85°, and more preferably from 60° to 75°. The horizontal distance C between the projector (e.g. the projection lens of the projector) and the plane of the screen (102) can be any suitable values, and is preferably less than 2 meters, such as less than 1 meter, and more preferably from 10 cm to 50 cm, and more preferably from 20 cm to 30 cm.

Depending upon the specific configuration of the screen, such as the configuration of the screen prisms, which will be discussed in the following, the screen many have different viewing angles. A viewing angle is a solid-angle originated from the screen (e.g. the center of the screen) and opens towards the viewer, as illustrated in FIG. 1b and FIG. 1c. The light beams within the solid-angle reach the viewer and can thus be perceived by the view. Light beams outside the viewing angle will not reach the viewer, and thus, can not be perceived by the viewer.

As an example, FIG. 1b schematically illustrates the vertical viewing angle of the screen. Assuming the center image pixel at the center O of the screen is illuminated by a beam of image light from the projector (e.g. 104 in FIG. 1), lines 114 and 116 are the edge rays of the light emitting from the center image pixel. The edge rays 114 and 116 together define a vertical viewing angle (e.g. in the ZY plane of the Cartesian coordinate) $\Omega_v$. As will be discussed afterwards with reference to FIG. 9, the vertical viewing angle can be in the range of +/−25° around the normal direction of the screen (e.g. around the Y axis), such as in the range of +/−10°. With the same assumption, lines 118 and 120 in FIG. 1c define the horizontal viewing angle $\Omega_h$, as schematically illustrated in FIG. 1c. The vertical viewing angle can be in the range of +/−45° around the normal direction of the screen (e.g. around the Y axis), such as in the range of +/−10°.

Figure 2B:
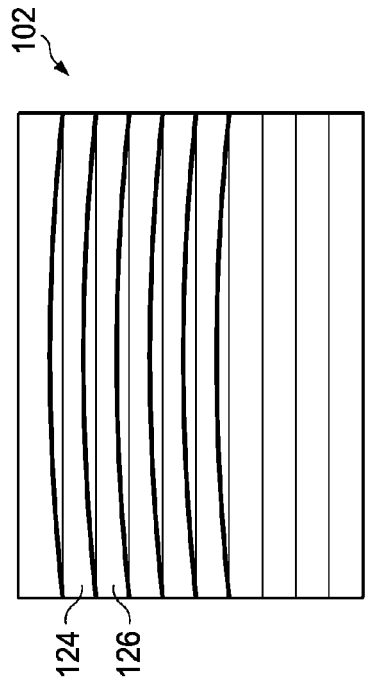
Figure 2C:
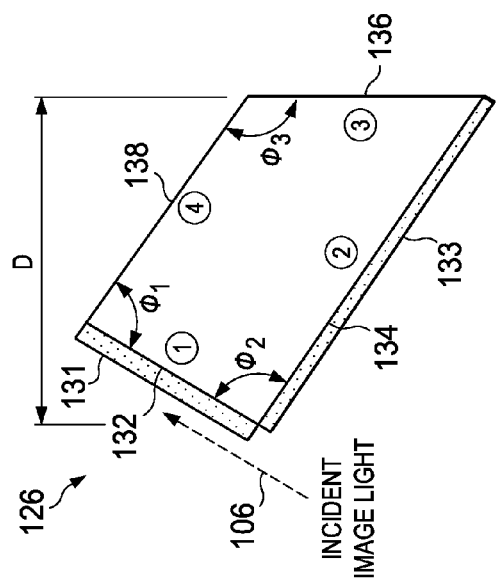
Figure 2A:
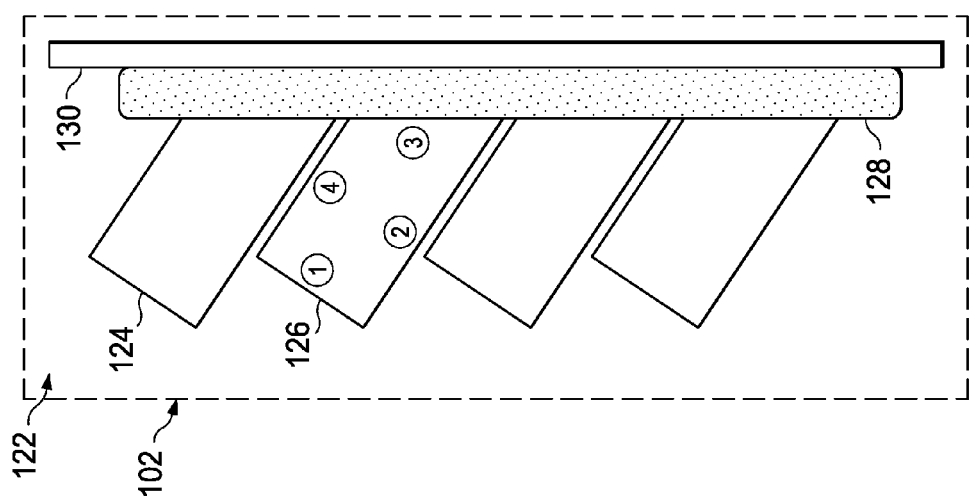

In order to reject or depress the ambient light, while maintaining the desired viewing angles, the screen comprises an array of transmissive prisms, as schematically illustrated in FIG. 2a. The transmissive prisms each comprise a receiving facet, from which the incident image light enters into the prism, and multiple totally-internal-reflection (TIR) surfaces.

Referring to FIG. 2a, a cross-sectional view taken along the plane perpendicular to the screen (vertical cross section) is schematically illustrated therein. The screen (102) comprises an array of transmissive prisms (122), such as prisms 124 and 126. The prisms are periodically arranged on a plane so as to form the front side (the side wherein images are to be displayed and viewed) of the screen. As an alternative feature, the prisms are attached to a light-absorbing layer (130) by, for example, gluing the prisms to the light-absorbing layer using a selected gluing material (128). In one example, the gluing material is transmissive to the image light or the ambient light (e.g. visible light), and has a optical refractive index $N_g$ smaller than the optical refractive index $N_L$ so as to guarantee the TIR surfaces between the prisms and the gluing material (e.g. at facet 3 of prism 126). A selected gluing material can also be used to bond the adjacent prisms (e.g. prisms 124 and 126); while guaranteeing that the interface between the adjacent prisms is a TIR surface (e.g. the TIR surface at facet 4 of prism 126). If adjacent prisms are attached, then the gluing material (128) can be eliminated, which can increase the TIR angle range.

The transmissive prisms can be arranged such that a facet of one prism is overlapped (and can be bonded) to a facet of the adjacent prism. For example, facet 2 of prism 124 is overlapped and aligned (e.g. parallel to) facet 4 of the adjacent prism 126. The transmissive prisms of the screen can be configured as polygonal prisms for example, along the horizontal direction, as schematically illustrated in FIG. 2b. Specifically, each prism can be polyhedral in cross section with a straight or curved profile along its length. In one example, the polyhedron can be a hexagonal polyhedron with the top and bottom facets and four major side-facets.

Referring to FIG. 2b wherein a front view of the screen (102) is schematically illustrated therein, the array of elongated prisms (e.g. 124 and 126) is deployed on the front side of the screen. The elongated prisms can be substantially straight along the length of the screen, as illustrated by the solid-lines in FIG. 2b. Alternatively, the elongated prisms can be curved, such as towards the top of the screen or the bottom of the screen. The curved elongated prisms can be of great importance in the short-throw projection setup, wherein the horizontal distance between the screen and the projector is 2 m or less, such as 1 m or less. When the projector is close to the screen, the incident angle of the image light on the screen will have a non-uniform distribution horizontally. Such angle variation can be corrected by curving the elongated prisms, such as towards the top edge of the screen. In one embodiment, the curve can be circular, with origin near or on the rotational axis of symmetry of the projection lens.

The prisms of the screen may have a wide range of optical and physical profiles. Referring to FIG. 2c, an exploded view of an exemplary prism that can be used in screen of FIG. 2a is schematically illustrated therein. In this example, prism 126 is drawn in a cross-sectional view, which is a polygon. The polygon cross-section comprises four major sides, corresponding to the four major facets of the elongated prism (e.g. prism 124 in FIG. 2a and FIG. 2b). Specifically, the polygon comprises side 132 corresponding to the elongated facet 1 of the elongated prism, side 134 corresponding to the elongated facet 2 of the elongated prism, side 136 corresponding to the elongated facet 3 of the elongated prism, and side 138 corresponding to the elongated facet 4 of the elongated prism.

Facets 1 and 2 of the elongated prism has an angle $\phi_2$, which can be 90° or any other desired angles, and more preferably larger than 90° in favor of large angle $\phi_3$ between facets 3 and 4. As will be discussed afterward, facets 3 and 4 are TIR surfaces for incident image light from the projector; and angle $\phi_3$ between facets 3 and 4 is preferably as large as possible, such as 90° or larger, 100° or larger, and 130° or larger. The angle $\phi_1$ between facets 4 and 1 may have any suitable vales, such as an angle around 90°, or from 45° to 130°.

Facet 2 is the receiving facet, through which image light from the projector (e.g. projector 104 in FIG. 1a) images the screen. In order to improve the optical performance such as the viewing angle, the facet (e.g. the external surface) of facet 2 can be provided with an optical diffuser layer (135). The optical diffuser layer (135) can be an engineered surface diffuser layer, a bulk-diffuser layer, or other optical diffuser layers, such as ground-glass diffusers, Teflon diffusers, holographic diffusers, extruded diffusers, and greyed glass diffusers. The optical diffuser can be symmetric or asymmetric optical diffusers; and can be unidirectional diffusers, such as vertical diffusers or horizontal diffusers, or can be omni-directional diffusers. In one example, a horizontal diffuser can be provided to the facets 2 such that the incident light is diffused horizontally (e.g. along the length of the elongated prisms and the screen); while the incident light is substantially not diffused vertically. In another example, an asymmetric surface or bulk diffuser can be provided at the facet 2. The optical diffuser layer (135) may have any suitable angular profiles, such as top hat, Gaussian, exponential, random, and other profiles. The diffuser layer may have any suitable diffusion angles, such as from 5° to 30°, or other desired angles. The diffuser can be provided as a separate optical element to the external surface of facet 2, or can be directly derived from the surface of facet 2, such as by micromachining or machining the external surface of facet 2 so as to form the desired optical diffusive layer, such as serrated surfaces or see-saw surface. In particular, when the external surface of facet 2 is fabricated as a serrate surface, a symmetric optical diffuser can be applied thereto.

Facet 1 is a facet receiving ambient light. In one example, facet 1 (132) is substantially parallel to the incident image light, such as image light 106, from the projector such that substantially no incident image light enters into the elongated prism through facet 1. In other examples, facet 1 may have a small angle with the incident image light from the projector, such as an angle from −5° to +5°.

As an alternative feature, an optically diffusive layer (131) can be formed on the external surface of facet 1 (132). The optical diffuser layer (131) may or may not be the same as the optical diffuser (135) on facet 2 (134). In other examples, the optical diffuser (131) can be directly derived from the surface of facet 1, such as by micromachining the external surface of facet 1 so as to form the desired optical diffusive layer.

The elongated prisms (e.g. 126) each may have a characteristic width D, which can be from 100 microns to 2 mm, such as from 500 microns to 1 mm. Each elongated prism can have a length substantially equal to the length of the effective viewing area of the screen.

The elongated prisms can be fabricated from any suitable materials that are transmissive to the image light, such as visible light. For example, the elongated prisms can comprise a polycarbonate material, a Polymethyl methacrylate (PMMA) material, and other suitable materials. The elongated prisms can be fabricated in many ways, such as extruding methods and other suitable methods. The elongated prisms of the array can be fabricated individually followed by assembly—such as by gluing the individual elongated prisms together using a selected gluing material, or can be fabricated together.

It is appreciated by those skilled in the art that the elongated prisms illustrated in FIG. 2a through FIG. 2c are only one of many possible examples. Many other variations are also applicable. For example, the elongated prisms each may have more than four major facets—that is more than four major sides in the cross-sectional view. The elongated prisms can be arranged periodically on a surface of the screen as illustrated in FIG. 2a, and alternatively, can be arranged in other ways. In the cross-sectional view taken along the plane perpendicular to the screen, substantially all major edges of the cross-section of the elongated prism are non-curved, however it is possible that a curved facet (with optical power) can add functionality. For example a curved facet 1 can provide for increased viewing angle. Alternatively the prisms may or may not be curved along the length of the elongated prisms. In another embodiment the prism cross section can change along its length, for example in a piecewise linear fashion or continuously or a combination.

Figure 3:
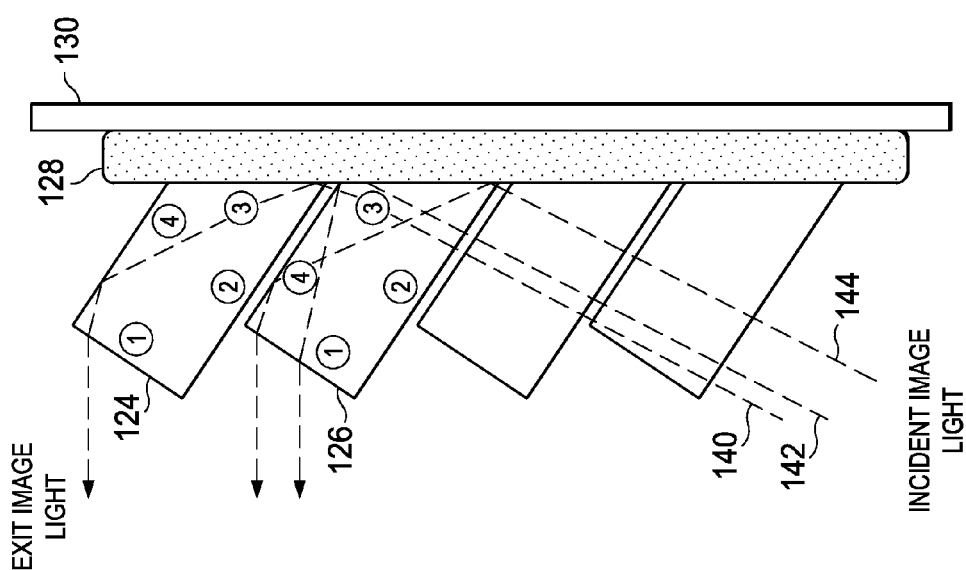

The screen with the elongated prisms as discussed above is capable of directing the image light to the viewers; while rejecting ambient light, wherein the ambient light and the image light each may comprise polarized and/or non-polarized light components. As an example, FIG. 3 schematically illustrates reflection of the incident image light from the projector by the screen.

For demonstration purpose, image light from the projector is represented by three image light beams 140, 142, and 144. The incident image light from the projector is substantially parallel to facets 1 of the elongated prisms in this example; and is received by the receiving facets 2 of the elongated prisms followed by TIR reflections. For example, image light 140 is received by facet 2 of elongated prism 124 (after passing through multiple elongated prisms that substantially do not change the propagation path of image light 140). After the receiving facet 2, image light 140 is sequentially reflected by the TIR surfaces 3 and 4 of elongated prism 124. The image light 140 then exits from facet 1 of the elongated prism 124 and propagates towards the viewer.

Incident image light 142 and 144 enter into elongated prism 126 through receiving facet 2 of elongated prism 126. After reflections by TIR surfaces 3 and 4 of elongated prism 126, image light 142 and 144 exits from facet 1 of elongated 126 towards the viewer.

It can be seen in the above example image light from the reflector is received by a receiving facet of an elongated prism, and reflected by multiple TIR surfaces of the elongated prism before exiting the elongated prism towards the viewer. The multiple TIR surfaces cause the received image light to evolve within the elongated prism from the direction entering the elongated prism towards a direction exiting from facet 1 of the elongated prism. The image light exiting from the elongated prisms of the screen together define the viewing angle of the screen.

Figure 4:
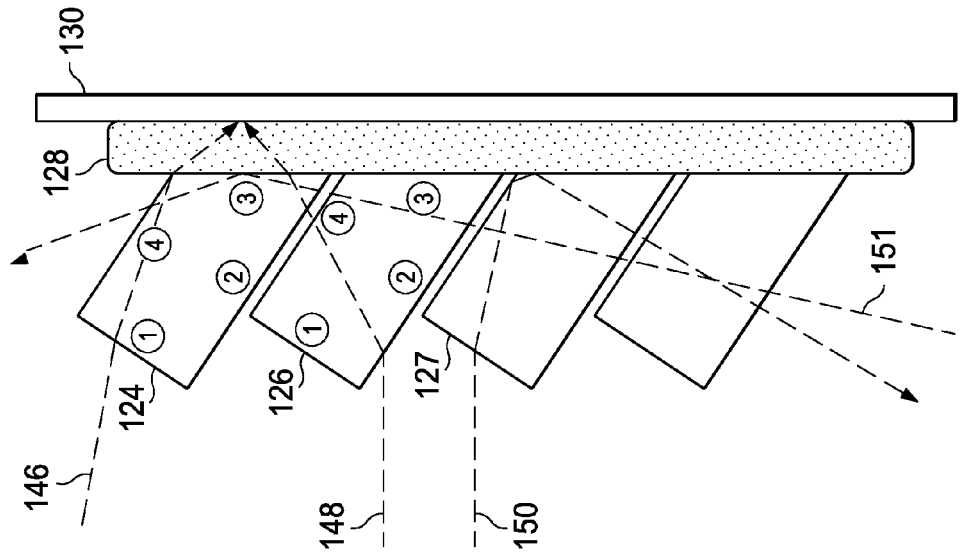

The image light from the projector can be directed to the viewers for viewing; while the ambient light can be rejected or depressed by the screen. FIG. 4 schematically demonstrates the rejection of the ambient light by the screen.

Referring to FIG. 4, ambient light can be incident to the screen and cause degradation of the perceived contrast ratio from multiple directions. For example, the ambient light from the ceiling of a conference room and incident to the screen can be represented by ambient light 146. The ambient light incident to the screen from the floor of the conference room can be represented by ambient light 151. Ambient light from other objects, such as furniture and walls, within the conference room can be represented by ambient light 148 and 150.

Ambient light from the ceiling, such as ambient light 146, enters into the elongated prisms, such as elongated prism 124, from the facets 1 of the elongated prisms. Such ambient light passes through the body of the elongated prisms, and exit from the facets 3 of the elongated prisms. By disposing a light-absorbing layer (130) at the facets 3, the light (e.g. the ambient light) exiting from facets 3 of the elongated prisms can be absorbed by the light absorbing layer.

Some portions of the ambient light from the ceiling of the conference room may enter into the elongated prisms from facets 4. This ambient light will exit from facets 3 as well and thus absorbed by the light absorbing layer (130). Some other portions of the ambient light from the ceiling of the conference room may incident to the gluing material (128) or the light absorbing layer (130), and thus be absorbed by the light absorbing layer. In this way, light from the ceiling of the conference room can substantially all be absorbed by the light absorbing layer, and is not redirected by the screen towards the viewers.

Ambient light 148 from the in-room objects enters into elongated prisms, such as elongated prism 126, through facets 2. This incident ambient light 148 passes through the body of the elongated prism or multiple elongated prisms, and propagates towards the light absorbing layer (130) that absorbs the incident light.

Ambient light from the in-room objects may be incident to the screen from facets 1 of the elongated prisms, such as ambient light 150. This ambient light is reflected by TIR surfaces 4 and 3, and exits from facet 2 of the elongated prism towards the projector.

Ambient light from the floor of the conference room near the plane of the screen, such as ambient light 151 from the floor, enters into an elongated prism, such as elongated prism 124, from facet 2, and reflected by a TIR surface, such as TIR surface 3 of the elongated prism. The reflected ambient light 151 exits from facet 4 of the elongated prism, and propagates towards the ceiling of the conference room.

It can be seen from the above discussion with reference to FIG. 4, ambient light from the ceiling, in-room-objects, and the floor of the conference room are directed away from the viewers are absorbed. As a consequence, the viewers do not perceive the ambient light, which improves the contrast-ratio in ambient light conditions.

Figure 5:
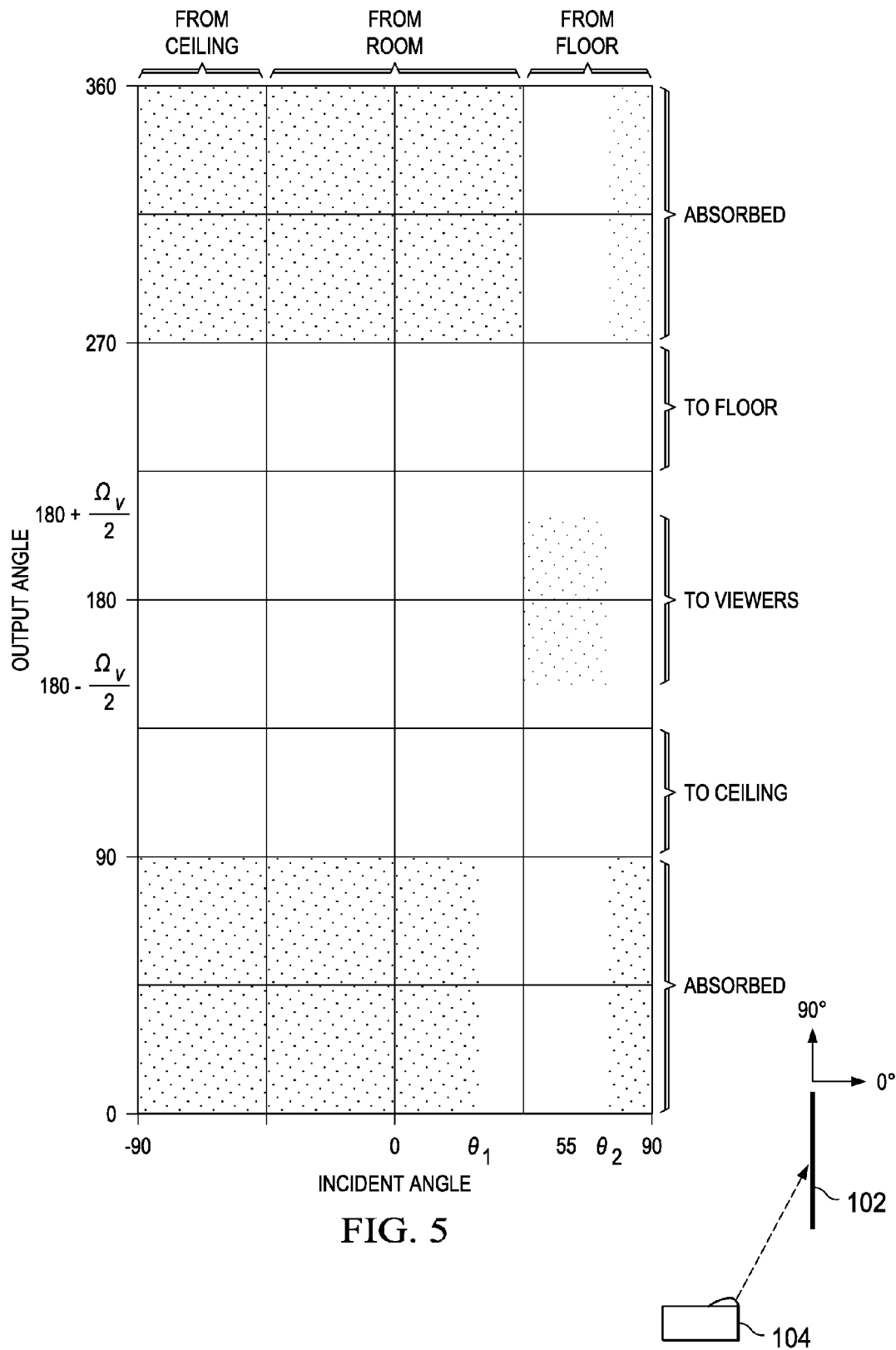
FIG. 5 is a diagram showing an ideal optical performance of the screen in directing the image light from the projector to the viewers and preventing the ambient light incident thereto to be reflected to the viewers.

The diagram in FIG. 5 demonstrates an ideal operation of a screen with the capability of rejecting ambient light, while capable of delivering image light to the viewers. Referring to FIG. 5, the horizontal axis plots the incident angle of the light incident to the screen. The light can be the image light from the projector and ambient light. The output angle of the light from the screen is plotted in the vertical axis. The incident and output angles are referred to the coordinate illustrated in the upper-left corner of the figure.

Incident light with an incident angle between −90° to 0° is the ambient light incident to the screen from the ceiling and the room. Light with an incident angle between 0° to $\theta_1$ and between $\theta_2$ to 90° is the ambient light incident to the front-side of the screen from the floor. Incident light with an incident angle between $\theta_1$ to $\theta_2$ is the image light incident to the front-side of the screen from the projector (104). Angles $\theta_1$ to $\theta_2$ are defined above with reference to FIG. 1a. Light exiting from the screen with an output angle between 0° to 90° is the light propagating towards the light absorbing layer. Light exiting from the screen with an output angle between 90° to 180°−$\Omega_v/2$ is the light propagating towards the ceiling of the conference room. Light exiting from the screen with an output angle between 180°−$\Omega_v/2$ and 180°+$\Omega_v/2$ is the light propagating towards the viewer. Light exiting from the screen with an output angle between 180°+$\Omega_v/2$ and 270° is the light propagating towards the floor. Light exiting from the screen with an output angle between 270° and 360° is the light propagating towards the light absorbing layer of the screen.

It can be seen in FIG. 5 that, the incident light having an incident angle from −90° to $\theta_1$ and the light having an incident angle from $\theta_2$ to 90° are substantially absorbed by the light absorbing layer of the screen or directed to the ceiling or the floor of the conference room, but not the viewers. The light incident to the screen with an incident angle from $\Theta_1$ to $\theta_2$, which is image light from the projector, is output by the screen towards the viewers.

Figure 6:
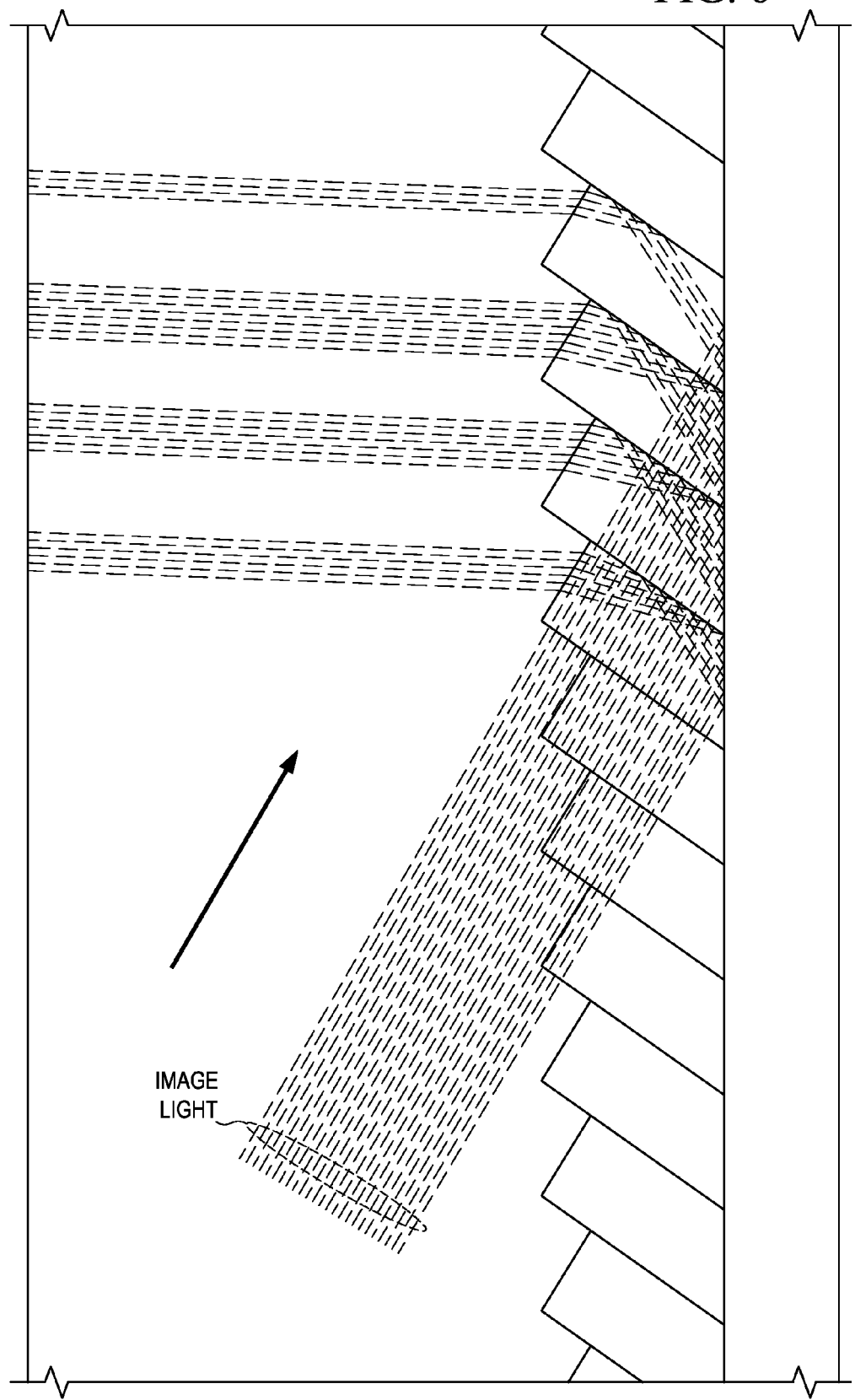
FIG. 6 presents a ray-tracing model of the imaging light from the projector propagating through the screen.
Figure 7:
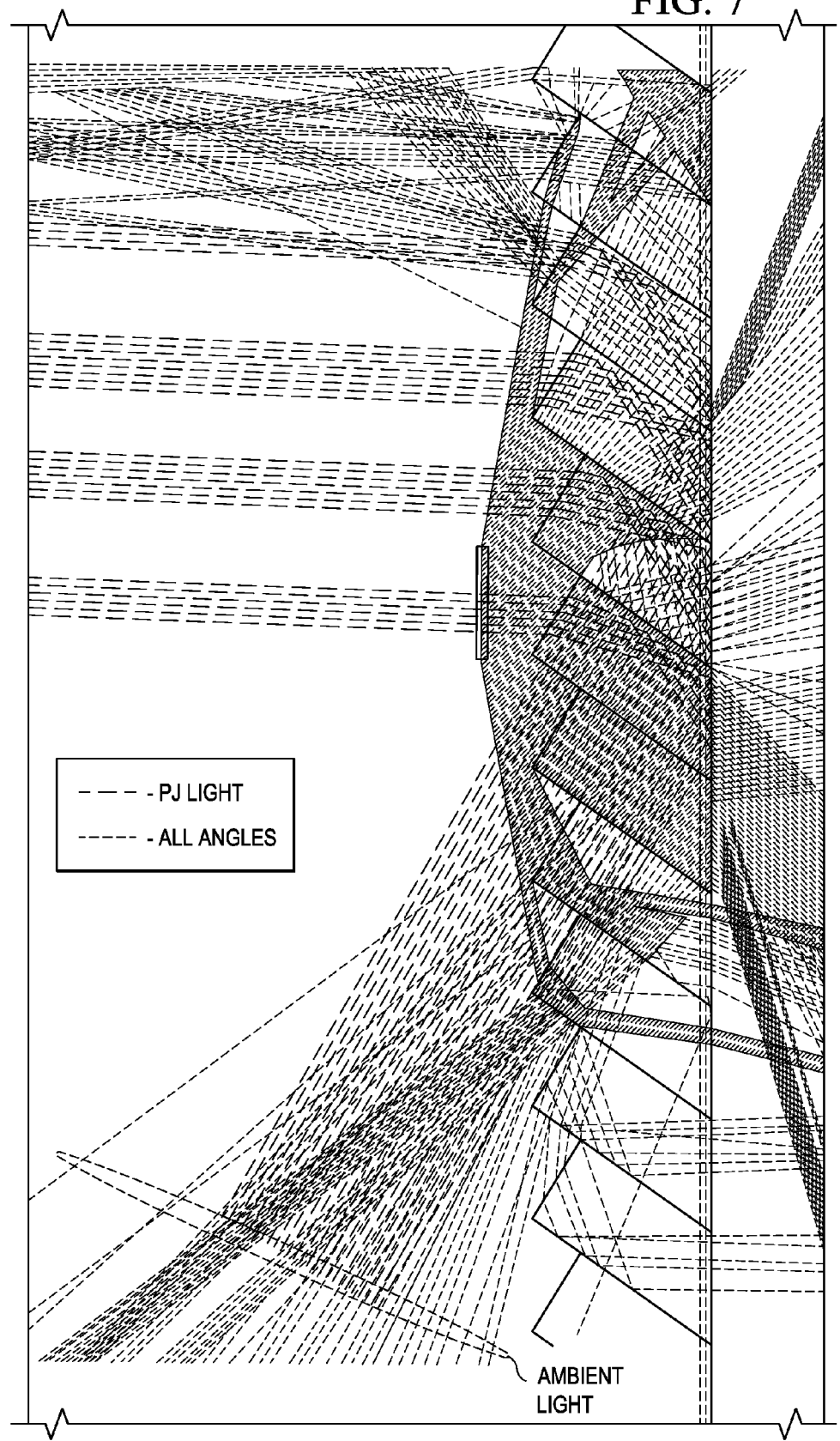
FIG. 7 presents a ray-tracing model of the ambient light propagating through the screen.

FIG. 6 and FIG. 7 demonstrate experimental ray-tracing examinations on the reflection of incident light by the screen. Referring to FIG. 6, image light from the projector is directed to the screen, and reflected by the elongated prisms of the screen towards the viewer. As can be seen in FIG. 7, the ambient light from the floor (except from the projector) is incident to the screen and propagates towards the back of the elongated prisms wherein a light absorbing layer can be disposed for absorbing the light incident thereto. Experimental data from ray-tracing experiments is presented in FIG. 8.

Figure 8:
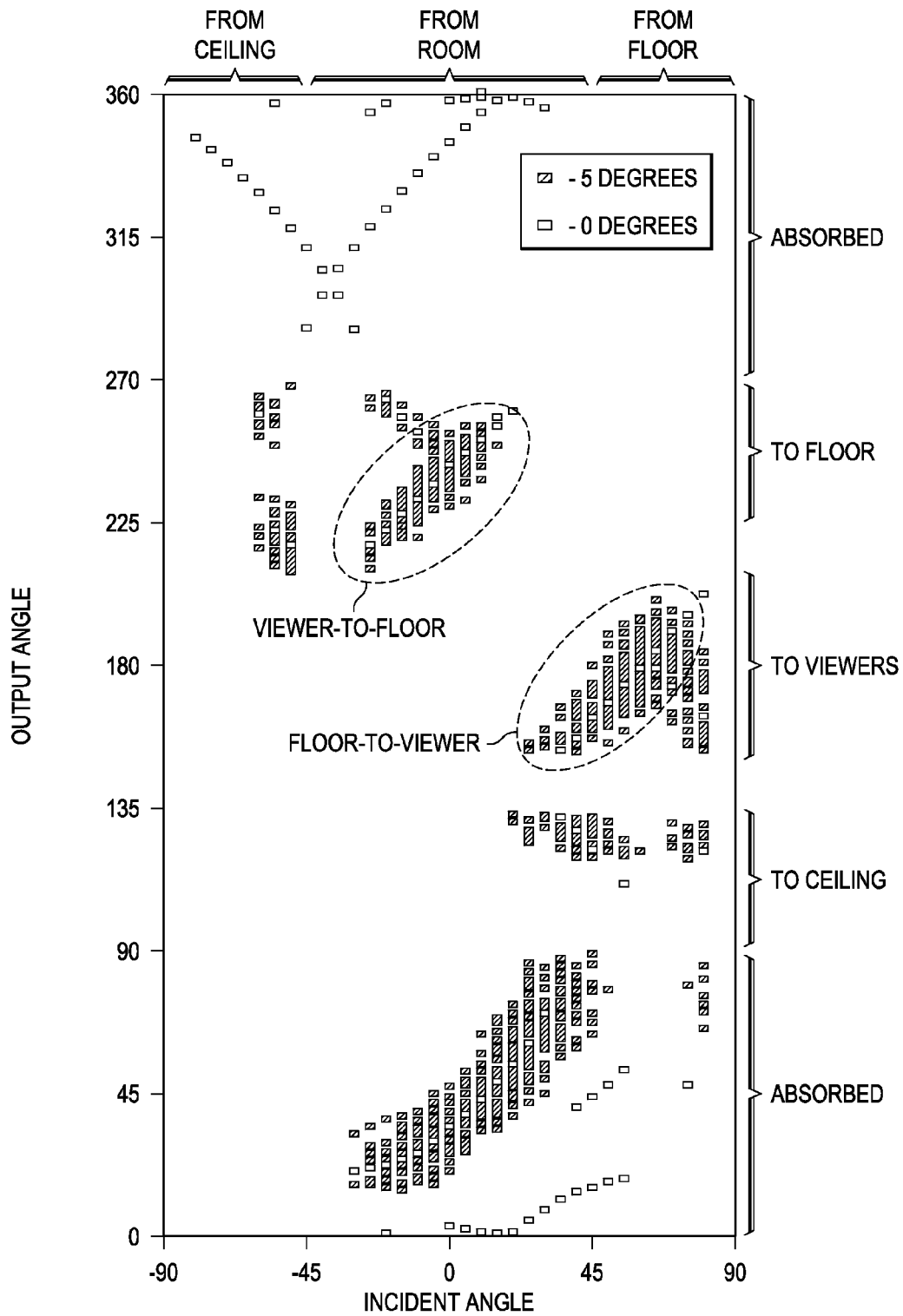
FIG. 8 is a diagram showing the results of the experiments FIG. 6 and FIG. 7.

Referring to FIG. 8, the experimental data is obtained by experiments using a 5° optical diffuser and a 0° diffuser in separate experiments with the optical diffusers are provided at the receiving facets 1 and 2 as illustrated in FIG. 2c.

As can be seen in FIG. 8, the light incident to the screen from the projector exits from the screen with an output angle between 180°±30°; while other light incident to the screen is directed to the ceiling, the floor, or the back (wherein light absorbing layer is located) of the screen. As such, the ambient light is depressed and prevented from being directed to the viewers.

For demonstration purpose, FIG. 9 presents a diagram showing the intensity of the light existing from the screen with different output angles. Accordingly, the vertical axis plots the light intensity; and the horizontal axis plots the vertical output angles. In this diagram, the central 0° axis corresponds to the 180° output axis in FIG. 5 and FIG. 8. The data in the diagram is obtained from an experiment wherein a 5° optical diffuser is applied to the facets 2 of the elongated prisms of the screen; and the image light is incident to the screen with a 60° incident angle. Due to the 5° optical diffuser on the facet 2 of the elongated prisms, the 60° incident image light from the projector is diffused into light with a specific angle range within the bodies of the elongated prisms.

As can be seen in FIG. 9, the 60° incident image light is output from the screen with output angles between 0°±20°, which corresponds to 180°±20° in FIG. 5 and FIG. 8. The effective vertical viewing angle can be defined as from −13° to +10°.

It will be appreciated by those of skill in the art that a new and useful screen capable of rejecting ambient light has been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof.

We claim:
1. A screen for use in a display system, comprising:
an array of elongated transmissive optical elements, each element comprising:
a first surface;
a second surface arranged to internally reflect light passing through the first surface;

a third surface arranged to internally reflect light reflected by the second surface, the third surface of one optical element adjacent and substantially parallel to the first surface of another optical element.

2. The screen of claim 1, wherein each elongated transmissive optical element comprises:
a fourth surface and wherein the second surface are totally-internal-reflection surfaces and the first and third surfaces are not totally-internal-reflection surfaces, wherein the fourth and second surfaces are adjacent surfaces of the elongated transmissive optical element.

3. The screen of claim 1, wherein at least a first portion of ambient light passes through the optical elements; and is directed away from a viewer.

4. The screen of claim 1, wherein each elongated optical element is a polyhedron.

5. The screen of claim 4, wherein the polyhedron is a hexagonal polyhedron.

6. The screen of claim 5, wherein the hexagonal polyhedron has a curved edge or surface.

7. The screen of claim 1, further comprising: a light absorbing layer attached to the optical element.

8. The screen of claim 2, further comprising: an optical diffuser on the first and the third surface, wherein the optical diffuser is a symmetric or asymmetric diffuser.

9. A method of directing image light from a projector to a viewer in a front-projecting process, the method comprising:
directing the image light carrying an image signal from the projector to an array of elongated prisms of the screen; and
delivering the image light to the viewer by the screen, comprising:
receiving the image light by a receiving facet of an elongated prism;
causing the received image light to evolve within the elongated prism and propagate towards an exit facet by total internal reflection from a first and second total internal reflection facet, wherein the receiving facet of one elongated prism is adjacent to and substantially parallel with a second total internal reflection facet of an adjacent elongated prism; and
delivering the image light to the viewer from the exit facet.

10. The method of claim 9, further comprising:
directing the image light carrying an image signal from the projector through the adjacent prism prior to said receiving step.

11. The method from 10, wherein the incident light is substantially parallel to the exiting facet.

12. The method of claim 9, wherein the image light exits from the screen has an angle with the screen from $-30°$ to $+30°$.

13. The method of claim 9, further comprising:
receiving an ambient light beam;
causing the ambient light to propagate along a direction away from the viewer.

14. The method of claim 13, wherein the ambient light is incident substantially perpendicular to the screen.

15. The method of claim 13, wherein the ambient light is received by the exiting facet of the elongated prism; and is directed towards a light absorbing layer of the screen.

16. The method of claim 9, wherein the viewer and the projector are on the same side of the screen.

17. A method of directing image light from a projector to a viewer in a front-projecting process, the method comprising:
directing the image light carrying an image signal from the projector to an array of elongated prisms of the screen; and
delivering the image light to the viewer by the screen, comprising:
receiving the image light by a receiving facet of a prism; and
causing the received image light to evolve within the prism and to exit from the prism towards a viewer by total internal reflection from a first and second total internal reflection facet, wherein the receiving facet of one prism is adjacent to and substantially parallel with a second total internal reflection facet of an adjacent prism.

18. The method of claim 17, further comprising:
directing the image light carrying an image signal from the projector through the adjacent prism prior to said receiving step.

19. The method of claim 17, wherein the viewer and the projector are on the same side of the screen.

20. The method of claim 17, wherein the prisms are elongated polygonal prisms that are transmissive to the visible light.

21. A screen for displaying an image, wherein the screen turns an incident light on an average between 90 and 135 degrees, wherein the turning is accomplished by one or more totally-internally-reflective reflections.

22. The screen of claim 21, wherein the number of reflections is 2 reflections.

23. The screen of claim 21, where the average exit angle is +/−20 degrees.

24. The screen of claim 21, where the average exit angle is +/−45 degrees.

25. An image projection system, comprising:
a light source;
a light valve comprising an array of individually addressable pixels;
a screen of claim 1; and
a set of optical elements for directing light from the light source to the light valve and from the light valve to the screen.

* * * * *